(12) United States Patent
Matsuo et al.

(10) Patent No.: US 8,985,551 B2
(45) Date of Patent: Mar. 24, 2015

(54) OIL IMMERSED SOLENOID

(75) Inventors: Masahiro Matsuo, Akashi (JP); Yuko Funakubo, Kobe (JP); Mitsuo Yoshimoto, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 87 days.

(21) Appl. No.: 13/980,673

(22) PCT Filed: Dec. 28, 2011

(86) PCT No.: PCT/JP2011/007363
§ 371 (c)(1),
(2), (4) Date: Oct. 4, 2013

(87) PCT Pub. No.: WO2012/098627
PCT Pub. Date: Jul. 26, 2012

(65) Prior Publication Data
US 2014/0028421 A1    Jan. 30, 2014

(30) Foreign Application Priority Data
Jan. 19, 2011 (JP) .................... 2011-009156

(51) Int. Cl.
*F16K 31/06*    (2006.01)
*H01F 7/08*    (2006.01)
*H01F 7/16*    (2006.01)

(52) U.S. Cl.
CPC *H01F 7/08* (2013.01); *F16K 31/06* (2013.01); *H01F 7/16* (2013.01)
USPC ...... 251/129.18; 251/337; 251/346; 251/351; 335/258

(58) Field of Classification Search
USPC ............ 251/129.01, 129.15, 129.18, 129.21, 251/337, 346, 351; 335/258; 137/625.65
See application file for complete search history.

(56) References Cited

U.S. PATENT DOCUMENTS 3,196,688 A * 7/1965 Smith ........................... 251/351
4,470,577 A * 9/1984 Warwick ....................... 251/217
(Continued)

FOREIGN PATENT DOCUMENTS

JP    Y-45-20148    8/1970
JP    U-59-3075     1/1984
(Continued)

OTHER PUBLICATIONS

Apr. 17, 2012 International Search Report issued in International Patent Application No. PCT/JP2011/007363.

*Primary Examiner* — John Bastianelli
(74) *Attorney, Agent, or Firm* — Oliff PLC (57) ABSTRACT

A solenoid includes: a movable core configured to move in a first space of a main body case in an axial direction to apply a biasing force to a spool; a fixed magnetic pole portion configured to attract the movable core in the axial direction; an adjusting spring configured to apply the biasing force to the movable core; a biasing force adjusting member provided at an opening end portion of a rear case and configured to adjust an axial position thereof to adjust the biasing force; and a degassing plug provided at an opening end portion of the adjusting member and including a degassing passage that allows a second space to communicate with an outside by changing relative positions of the adjusting member and the degassing plug. A sealing portion configured to open or close communication between degassing passages is provided between the adjusting member and the degassing plug.

7 Claims, 6 Drawing Sheets

(56) References Cited

U.S. PATENT DOCUMENTS

| | | | |
|---|---|---|---|
| 4,807,847 A * | 2/1989 | Martz | 251/144 |
| 5,204,652 A * | 4/1993 | Baker et al. | 335/258 |
| 5,950,605 A * | 9/1999 | Hussey et al. | 251/129.18 |
| 6,220,275 B1 * | 4/2001 | Nishinosono et al. | 251/129.21 |
| 6,269,827 B1 * | 8/2001 | Potter | 137/625.65 |
| 6,386,220 B1 * | 5/2002 | Koenings | 137/625.65 |
| 6,581,905 B2 * | 6/2003 | Rafko et al. | 251/148 |
| 6,796,322 B2 * | 9/2004 | Sen | 137/625.65 |
| 6,848,475 B2 * | 2/2005 | Smith | 137/625.65 |
| 6,918,571 B1 * | 7/2005 | Rose | 335/258 |
| 7,134,641 B2 * | 11/2006 | Jensen et al. | 251/149.8 |

FOREIGN PATENT DOCUMENTS

| | | |
|---|---|---|
| JP | U-59-179172 | 11/1984 |
| JP | A-2009-270590 | 11/2009 |
| JP | A-2010-67857 | 3/2010 |

* cited by examiner

OIL IMMERSED SOLENOID

TECHNICAL FIELD

The present invention relates to an oil immersed solenoid used in a hydraulic device, such as a valve device, used in construction machinery or the like and including a spring load adjustment mechanism and a degassing mechanism.

BACKGROUND ART

Oil immersed solenoids have been used to control the pressure and flow rate of operating oil flowing through a valve device. One example of the oil immersed solenoids is shown in a longitudinal sectional view of FIG. 6. An oil immersed solenoid 111 is configured such that: a movable core 114 that is movable in an axial direction is provided in a tubular space 122 of a case 117; a fixed magnetic pole portion 113 is provided coaxially with the movable core 114; and an exciting coil 112 is provided at an outer periphery of the fixed magnetic pole portion 113.

According to the oil immersed solenoid 111, by supplying a command electric signal (exciting current) to the exciting coil 112, an attractive force (force in the axial direction) corresponding to the magnitude of the command electric signal is generated at the fixed magnetic pole portion 113. Then, by the attractive force, the movable core 114 is attracted toward the fixed magnetic pole portion 113. A first rod 121 is provided at an axial center portion of the movable core 114. Therefore, the attractive force acting on the movable core 114 can be changed by changing the magnitude of the command electric signal, and with this, an axial biasing force (force in a left direction in FIG. 6) of the first rod 121 can be adjusted (see PTL 1, for example).

Figure 6:
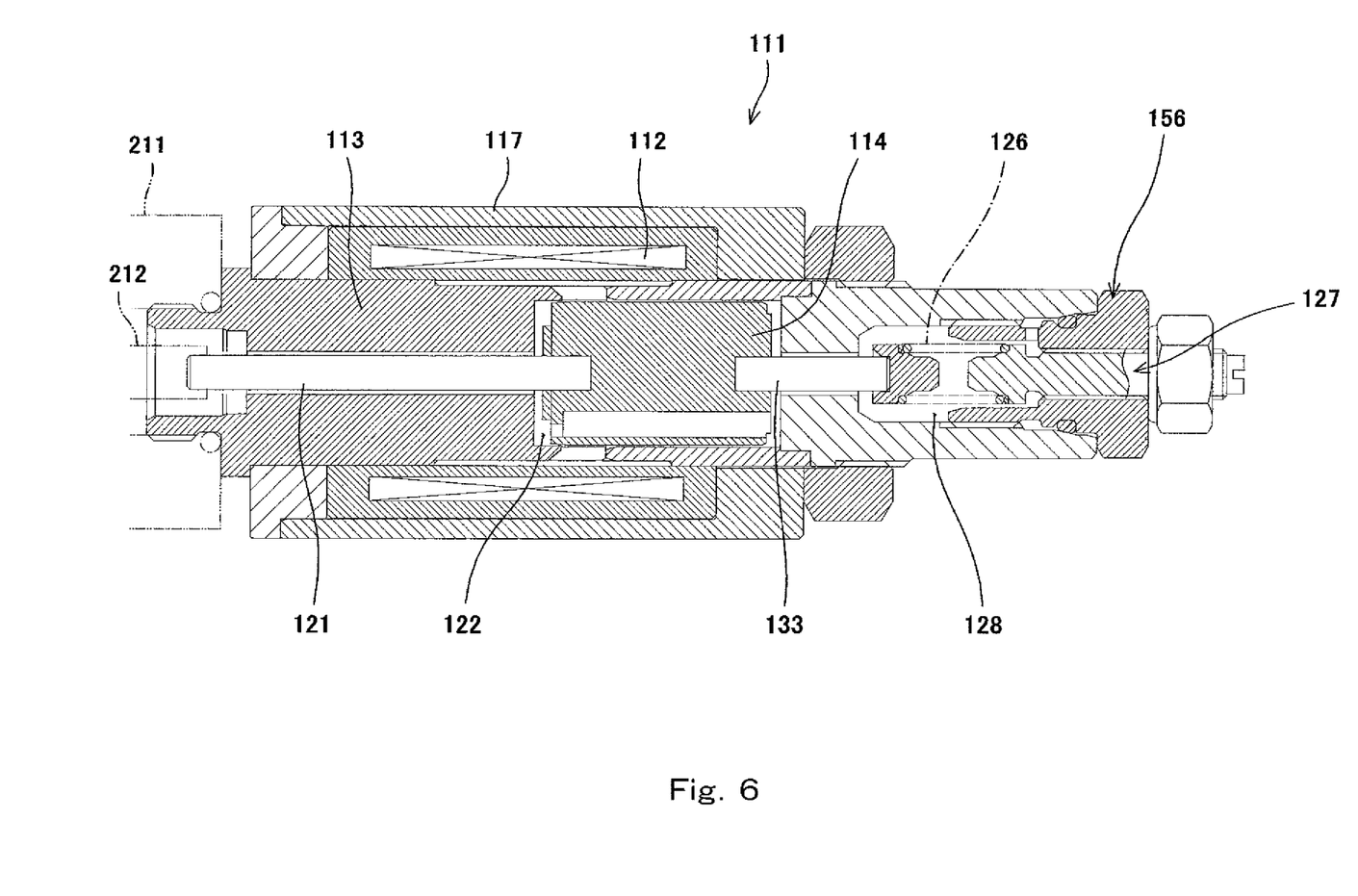
FIG. 6 is a longitudinal sectional view showing a conventional oil immersed solenoid.

For example, the oil immersed solenoid 111 is attached so as to cause a spool (control part) 212 of a valve device 211 to move in the axial direction. Then, the attractive force of the movable core 114 is changed by controlling the command electric signal. Thus, the biasing force of the first rod 121 to push the spool 212 of the valve device 211 in the axial direction is adjusted.

According to the oil immersed solenoid 111, by adjusting the axial biasing force acting on the movable core 114, the spool 212 stops at a position where the biasing force and a force acting from an opposite side of the rod to the spool 212 based on a spring force, an oil pressure, and the like balance. With this, the pressure and flow rate of the operating oil flowing through the valve device 211 are caused to be proportional to the command electric signal.

In reality, it is impossible to produce machined parts constituting the oil immersed solenoid 111 and the valve device 211 such that the same machined parts have the same size. Therefore, the parts are produced within a certain dimensional tolerance range. This dimensional tolerance range is narrow. However, because of this dimensional tolerance, even in the case of using the oil immersed solenoids of the same standard, the axial biasing force acting on the first rod via the movable core by the same command electric signal vary. With this, the force acting on the first rod 121 from the spool 212 also vary. In addition, since an initial biasing force generated when the command electric signal is not supplied differs depending on specifications of hydraulic mechanisms, the initial biasing force needs to be adjustable.

Here, to correct the variations and adjust the biasing force in accordance with the specifications of the hydraulic devices, as in the oil immersed solenoid 111 shown in FIG. 6, an adjusting spring 126 for setting the initial biasing force of the movable core 114, that is, the first rod 121 is provided. In the oil immersed solenoid 111 shown in FIG. 6, the adjusting spring 126 is provided so as to bias the movable core 114 via a second rod 133 in a direction toward the fixed magnetic pole portion 113.

The initial biasing force of the adjusting spring 126 can be adjusted by an adjusting screw 127 provided at one side of the adjusting spring 126, the side being opposite to the movable core side. An axial position of the adjusting screw 127 is adjusted by adjusting a length of thread engagement of the adjusting screw 127. With this, the initial biasing force of the adjusting spring 126, that is, the initial biasing force of the first rod 121 is adjusted.

By adjusting the initial biasing force of the adjusting spring 126 as above, the variations in the force by the dimensional tolerance generated at the time of the production of the parts can be corrected. In addition, the initial biasing force can be adjusted so as to correspond to the specifications of the hydraulic devices.

If air exists in the oil that fills internal spaces 122 and 128 in the oil immersed solenoid 111, damping actions realized by the incompressibility of the oil are spoiled by the compression of the air in the oil, and this may cause, for example, chattering of the movable core 114. Therefore, a degassing operation of the oil in the internal spaces 122 and 128 is performed.

The degassing operation needs to be performed also in a case where the chattering or the like has occurred after the adjustment of the initial biasing force of the adjusting spring 126.

Here, in the above conventional art, after the initial biasing force of the adjusting spring 126 is adjusted by the adjusting screw 127, the degassing operation of loosening a degassing plug 156 together with the adjusting screw 127 to remove the air and air bubbles existing in the internal spaces 122 and 128 together with the oil is performed. After that, by tightening the degassing plug 156 back to the original position, the adjusting spring 126 can be returned to the state realized after the above adjustment.

CITATION LIST

Patent Literature

PTL 1: Japanese Laid-Open Patent Application Publication No. 2010-67857

SUMMARY OF INVENTION

Technical Problem

Here, some of the valve devices and the like controlled by this type of oil immersed solenoid require extremely strict control of the biasing force.

In the above conventional art, when the degassing plug 156 is loosened in the degassing operation, the adjusting spring 126 is temporarily separated from a seat portion. Therefore, even if the degassing plug 156 is returned to the original position after the degassing operation, and with this, the adjusting screw 127 is returned to the position of the state realized after the adjustment of the biasing force, there is a possibility that the twisted state and seating state of the adjusting spring 126 change, and this slightly changes the biasing force. Therefore, as described above, in the case of controlling the control part that requires the extremely strict adjustment of the initial biasing force of the adjusting spring 126, readjustment may be required.

Depending on the type of the control part, the degassing operation may be performed in a state where the oil immersed solenoid 111 is being attached to the control part (spool 212), and a force is acting from the control part toward the oil immersed solenoid 111. In this case, the degassing operation needs to be performed in a state where the position of the control part is maintained by the biasing force of the adjusting spring 126. However, in the above conventional art, the adjusting spring 126 is surely separated from the seat portion in the degassing operation. Therefore, the above conventional art cannot be used in a case where the control part needs to be biased even in the degassing operation.

Further, in the above conventional art, in the degassing operation, the oil flows out to, for example, side surfaces of the oil immersed solenoid and is difficult to recover, and the oil contaminates the oil immersed solenoid and its peripheral devices. Therefore, it requires time to clean the oil immersed solenoid 111 and its periphery, and this deteriorates the work efficiency.

In addition, in the degassing operation, the oil is normally discharged by the hydraulic pressure in the solenoid. Therefore, if the hydraulic pressure in the solenoid is low, there is a possibility that the degassing operation requires time, the degassing performance is low, and the degassing is not adequately performed.

Solution to Problem

Here, an object of the present invention is to provide a degassing mechanism of an oil immersed solenoid capable of performing degassing of the solenoid without changing the states of an adjusting spring at all after the adjustment of an initial biasing force of the adjusting spring, and the oil immersed solenoid including the degassing mechanism.

To achieve the above object, an oil immersed solenoid according to the present invention includes: a case having a tubular internal space; a movable core configured to move in the internal space of the case in an axial direction of the internal space to apply a biasing force to a control part; a fixed magnetic pole portion configured to attract the movable core in the axial direction of the internal space; an adjusting spring configured to apply the biasing force to the movable core; a biasing force adjusting member provided at an opening end portion of the case and configured to adjust an axial position thereof to adjust the biasing force of the adjusting spring; and a degassing member provided at an opening end portion of the biasing force adjusting member and including a degassing passage that allows the internal space to communicate with an outside by changing relative positions of the biasing force adjusting member and the degassing member, wherein a sealing portion configured to open or close the degassing passage is provided between the biasing force adjusting member and the degassing member. In the present description and claims, the "axial direction" denotes a direction in which the movable core moves. The axial position of the biasing force adjusting member, including an initial biasing force adjustment position and a biasing force readjustment position, is adjusted by, for example, a screw mechanism.

With this, the biasing force can be adjusted by adjusting an attachment height (axial height) of the adjusting spring by the biasing force adjusting member, and the adjusted biasing force (spring load) of the adjusting spring can be maintained by maintaining the axial position of the biasing force adjusting member. In this state, by changing the relative position of the degassing member relative to the biasing force adjusting member, the internal space of the case can be caused to communicate with the outside through the degassing passage of the degassing member. With this, the degassing operation can be performed by discharging the oil in the internal space without changing at all the states of the adjusting spring whose position has been adjusted. Then, by returning the degassing member to the original position after the degassing operation, the degassing passage can be closed by the sealing portion. Therefore, even in a case where the degassing operation of the case is performed after the adjustment of the initial biasing force of the adjusting spring, the degassing operation can be independently performed without moving the adjusting spring. Therefore, the degassing operation can be performed without changing the adjusted biasing force of the adjusting spring at all.

The degassing member may include a pipe connection portion at an outside open portion of the degassing passage. In the present description and claims, the "pipe connection portion" denotes a portion to which a component, such as a pipe or a hose, through which oil can be discharged, can be connected. With this, the oil discharged through the degassing passage of the degassing member and the pipe connection portion can be recovered. With this, the degassing operation can be performed without contaminating the periphery of the oil immersed solenoid with the oil. In addition, by suctioning the oil through the pipe, the oil in the internal space can be forcibly removed, and fine air bubbles can be surely removed. Thus, the degassing performance improves, and the degassing operation can be performed quickly.

The biasing force adjusting member may include a screw mechanism that allows the degassing member to move in an axial direction of the biasing force adjusting member, and the sealing portion may include a sealing surface configured to open or close the degassing passage in such a manner that the degassing member is caused to move in the axial direction of the biasing force adjusting member by the screw mechanism. With this, by loosening the degassing member in the axial direction, the sealing surface opens. Therefore, the oil in the internal space is discharged through the degassing passage, so that the degassing operation can be performed. Thus, the degassing operation can be easily performed. In addition, by tightening the degassing member in the axial direction after the degassing operation, the degassing passage can be easily closed at the sealing surface.

The sealing portion may be constituted by the sealing surface provided at an end portion of the degassing member and a sealing valve seat provided at the biasing force adjusting member. With this, by causing the sealing surface of the end portion of the degassing member and the sealing valve seat of the biasing force adjusting member to tightly contact each other or be separated from each other, the communication between the internal space and the degassing passage can be surely opened or closed.

The oil immersed solenoid may include a sealing member provided between the biasing force adjusting member and the degassing member and configured to seal between the biasing force adjusting member and the degassing member when the degassing member moves in the axial direction. With this, the space between the biasing force adjusting member and the degassing member is surely sealed when the degassing member moves in the axial direction and the degassing operation is performed. Thus, during the degassing operation, the oil in the internal space can be surely prevented from flowing out through the space between the biasing force adjusting member and the degassing member, and the air can be surely prevented from getting inside through the space between the biasing force adjusting member and the degassing member.

The adjusting spring may be a compression coil spring, the compression coil spring may be provided such that a central axis thereof coincides with a central axis of the biasing force adjusting member, the degassing member may be provided on the central axis of biasing force adjusting member, and the degassing passage may be provided on a central axis of the degassing member. With this, it is possible to configure the oil immersed solenoid in which the mechanism configured to adjust the biasing force of the adjusting spring and the mechanism configured to remove the oil in the internal space are arranged coaxially and which can stably remove the oil in the internal space through the central axis.

An attachment height of the adjusting spring may be variably adjusted by causing the biasing force adjusting member, threadedly engaged with the opening end portion of the case, to move in the axial direction, the biasing force adjusting member may include a screw portion on an outer surface of a rear portion thereof, and by causing a nut to be threadedly engaged with the screw portion and causing the nut to push an end surface of the case, the biasing force adjusting member may be fixed to the case, and the attachment height of the adjusting spring may be fixed. With this, by causing the nut, threadedly engaged with the screw portion of the biasing force adjusting member, to push the end surface of the case, the axial relative positions of the case and the biasing force adjusting member can be fixed, and the attachment height of the adjusting spring can be easily fixed.

Advantageous Effects of Invention

According to the present invention, the degassing operation of the case can be performed while maintaining the states of the adjusting spring adjusted by the biasing force adjusting member. Therefore, the degassing operation can be performed while maintaining the setting of the control device. To be specific, the degassing operation can be performed without changing the states of the adjusting spring whose biasing force has been strictly adjusted.

DESCRIPTION OF EMBODIMENTS

Hereinafter, embodiments of the present invention will be explained based on the drawings. In the present embodiment, a push-type oil immersed solenoid 11 will be explained. The oil immersed solenoid 11 is, for example, a proportional solenoid, and the following will explain an example in which the oil immersed solenoid 11 is attached to the valve device 211 configured to control a fluid device (hydraulic device). In the following explanation, a left direction in FIG. 1 corresponds to a tip end direction, and a right direction in FIG. 1 corresponds to a rear end direction.

Figure 1:
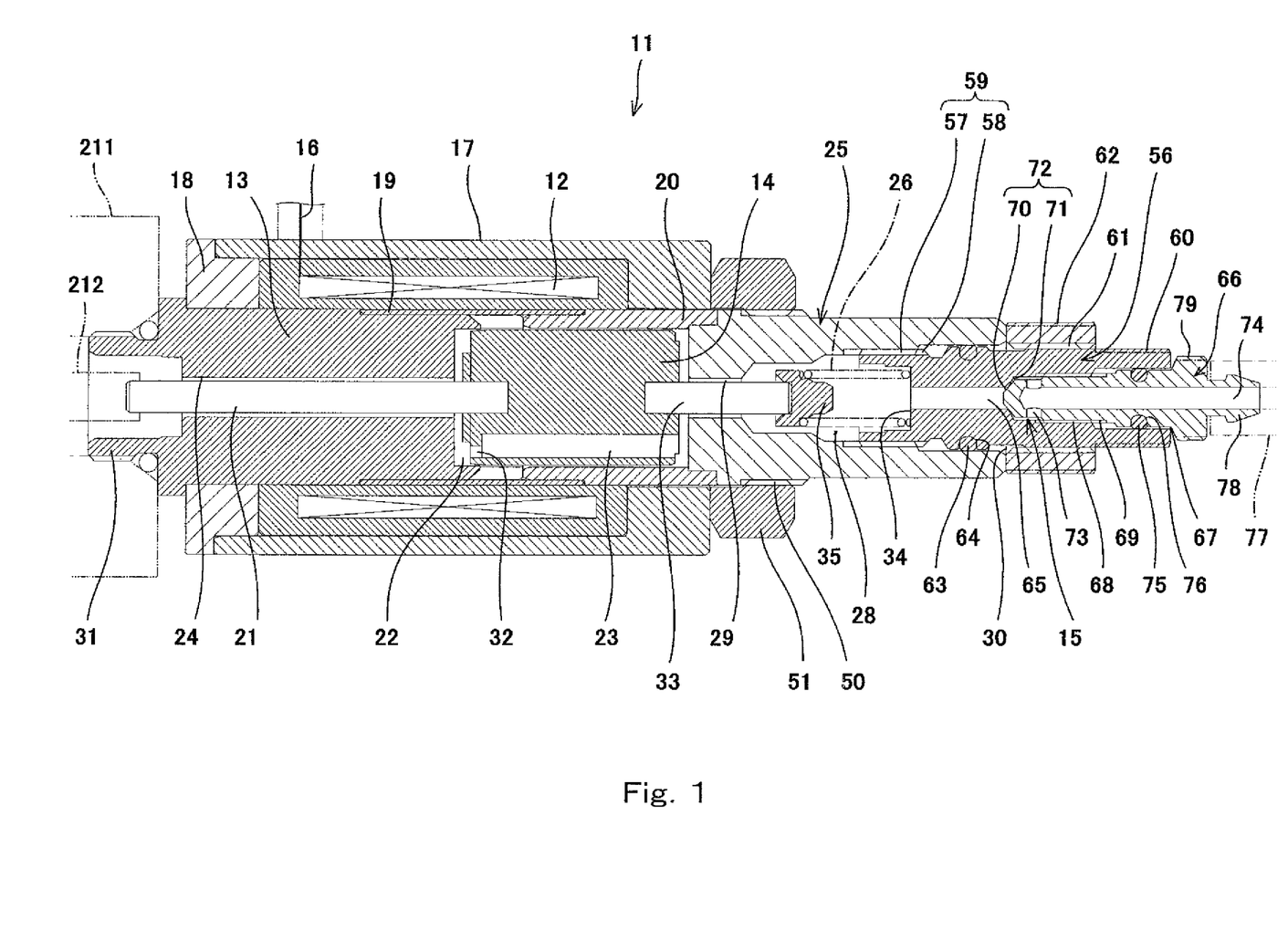
FIG. 1 is a longitudinal sectional view showing an oil immersed solenoid including a degassing mechanism according to Embodiment 1 of the present invention.

As shown in FIG. 1, the oil immersed solenoid 11 of the present embodiment is attached to the valve device 211 to control the spool 212 (control part) of the valve device 211 and is used to control the pressure and flow rate of a fluid, such as operating oil, flowing through the valve device 211. A case of the oil immersed solenoid 11 is constituted by a main body case 17 having a cylindrical shape and made of a metal and a rear case 25 fixed to a rear portion of the main body case 17.

The main body case 17 includes an exciting coil 12 to which a command electric signal (exciting current) is supplied through a wire 16. In addition, the main body case 17 includes a tubular internal space. In this internal space, a fixed magnetic pole portion 13 at which a magnetic pole is generated by the exciting coil 12 and a movable core 14 configured to be attracted by the fixed magnetic pole portion 13 are provided. The exciting coil 12 is formed in a cylindrical shape and electrically insulated. The exciting coil 12 is provided inside the main body case 17 and a yoke 18 configured to close a tip end portion of the main body case 17 and having an annular shape.

The fixed magnetic pole portion 13 is a magnetic body having a columnar shape and is provided inside the exciting coil 12. A tip end portion 31 of the fixed magnetic pole portion 13 can be attached to the valve device 211. The tip end portion of the fixed magnetic pole portion 13 is located inside the yoke 18, and a substantially middle portion of the fixed magnetic pole portion 13 is located inside a tip end portion of the exciting coil 12. A rear end portion of the fixed magnetic pole portion 13 is located inside and fixed to a tip end portion of a first guide 19 provided on an inner surface of the main body case 17 and having a cylindrical shape. The first guide 19 is made of a non-magnetic metal.

The first guide 19 is joined to a tip end portion of a second guide 20 provided at a rear side and having a cylindrical shape. The second guide 20 is provided so as to be spaced apart from the fixed magnetic pole portion 13. A tip end portion of an outer peripheral surface of the second guide 20 is located inside a rear end portion of the first guide 19, and a substantially middle portion of the outer peripheral surface of the second guide 20 is located inside a rear end portion of the exciting coil 12. A rear end portion of the second guide 20 is provided inside a rear end portion of the main body case 17. The second guide 20 is made of a magnetic metal.

In the main body case 17 in which the above components are provided, a first space (internal space) 22 is formed inside the rear end portion of the fixed magnetic pole portion 13, the first guide 19, and the second guide 20. The first space 22 communicates with an inside of the valve device 211 through a center hole 24 formed so as to penetrate a center of the fixed magnetic pole portion 13. With this, the oil in the valve device 211 flows through the center hole 24 into the first space 22.

The movable core 14 having a columnar shape is provided inside the second guide 20 having the cylindrical shape. The movable core 14 is movable in the axial direction (left-right direction in FIG. 1) along an inner surface of the second guide 20 in the first space 22.

A through hole 23 is formed in the movable core 14 so as to extend in the axial direction. A restricting opening 32 having a smaller diameter than the through hole 23 is formed at the fixed magnetic pole portion 13 side of the through hole 23. The restricting opening 32 is formed such that when the movable core 14 moves in the first space 22, the movable core 14 moves smoothly by utilizing fluid resistance (damper effect) generated when the oil in the first space 22 flows through the restricting opening 32.

A rear end portion of a first rod 21 is joined to a tip end portion of the movable core 14. The first rod 21 is inserted through the center hole 24 of the fixed magnetic pole portion 13 so as to be movable in the axial direction. A tip end portion of the first rod 21 is joined to a rear end portion of the spool 212 of the valve device 211.

The rear case 25 having a cylindrical shape is attached to the rear end portion of the second guide 20. The rear case 25 is joined to a rear end of the second guide 20 and fixed to the main body case 17 by tightening a fixing nut 51 on a screw portion 50 formed on an outer periphery of the rear case 25. Used as the fixing nut 51 is a normal hexagon nut.

Further, a center hole 29 communicating with the first space 22 is formed at a center portion of the rear case 25 so as to extend in the axial direction. A second rod 33 is inserted through the center hole 29, and a tip end portion of the second rod 33 is joined to a rear end portion of the movable core 14. An opening end portion 30 is formed at a rear portion of the rear case 25, the rear portion being located on a side opposite to the spool 212 side. A second space (internal space) 28 having a cylindrical shape is formed inside the rear case 25. The second space 28 communicates with the first space 22 through the center hole 29. The first space 22 and the second space 28 are collectively called an "internal space".

Then, a biasing force adjusting member 56 and a degassing mechanism 15 are provided so as to seal the opening end portion 30 from a rear portion of the second space 28 of the rear case 25. The opening end portion 30 of the rear case 25 is sealed by the biasing force adjusting member 56 and the degassing mechanism 15.

The initial biasing force adjustment mechanism 56 (hereinafter may be simply referred to as an "adjusting member") is provided so as to move in the axial direction in the second space 28 of the rear case 25. An adjustment external screw portion 58 is provided on an outer periphery of the adjusting member 56. The adjustment external screw portion 58 is threadedly engaged with an adjustment internal screw portion 57 formed at a predetermined position of an inner peripheral portion of the rear case 25. An axial position of the adjusting member 56 can be adjusted by a screw mechanism 59 including the adjustment internal screw portion 57 and the adjustment external screw portion 58. The axial relative position of the adjusting member 56 relative to the rear case 25 can be adjusted in such a manner that: the adjustment external screw portion 58 is threadedly engaged with the adjustment internal screw portion 57 of the rear case 25; and a rotating portion 60 (for example, a hexagon nut shape) provided at a rear end portion of the adjusting member 56 is rotated. The axial position of the adjusting member 56 can be fixed in such a manner that: a fixing nut 62 is threadedly engaged with a fixing external screw portion 61 formed on an outer surface of a rear portion of the adjusting member 56; and the fixing nut 62 is tightened to push a rear end surface of the rear case 25. The fixing nut 62 is a lock nut of the adjusting member 56. By fixing the adjusting member 56 to the rear case 25, an attachment height (axial height) of a below-described adjusting spring 26 is fixed.

A sealing member 63 is provided between the outer periphery of the adjusting member 56 and the outer periphery of the rear case 25. The sealing member 63 is an O ring provided at an annular groove (O ring groove) 64 formed on the outer periphery of the adjusting member 56. The axial position of the sealing member 63 is located between the screw mechanism 59 and the fixing external screw portion 61. Even when the position of the adjusting member 56 is adjusted in the axial direction, the sealing member 63 always seals between the rear case 25 and the adjusting member 56.

The adjusting spring 26 is provided between the biasing force adjusting member 56 and the second rod 33 and biases the movable core 14 in a direction in which the fixed magnetic pole portion 13 attracts the movable core 14. When an operator rotates the rotating portion 60 of the adjusting member 56 to adjust the axial position of the adjusting member 56, the biasing force of the adjusting spring 26 with respect to the second rod 33 changes in accordance with the attachment height of the adjusting spring 26. With this, a force of biasing the movable core 14 and the first rod 21, which move together with the second rod 33, toward the spool 212 of the valve device 211 can be adjusted.

The adjusting spring 26 is a compression coil spring, and a tip end portion of the adjusting spring 26 is supported by a second spring seat 35 provided at a rear end portion of the second rod 33. A first spring seat 34 is formed at an axial center portion of a tip end portion of the adjusting member 56. A rear end portion of the adjusting spring 26 is inserted in and supported by the first spring seat 34. Further, an adjusting member degassing passage 65 is provided at the biasing force adjusting member 56 so as to extend from a center portion of the first spring seat 34 toward a rear side in the axial direction. The adjusting member degassing passage 65 opens at a rear portion where a below-described degassing plug 66 is provided.

Then, the degassing plug 66 that is a degassing member is provided at an axial center portion of the rear portion of the adjusting member 56. The degassing plug 66 is provided so as to seal an opening end portion 67 provided at the axial center portion of the rear portion of the adjusting member 56. Inside the opening end portion 67, a plug internal screw portion 68 is formed on an inner surface of the adjusting member 56. The degassing plug 66 is attached to the adjusting member 56 in such a manner that a plug external screw portion 69 formed on an outer surface of the degassing plug 66 is screwed into the plug internal screw portion 68. A rotating portion 79 (for example, a hexagon nut shape) of the degassing plug 66 is rotated with a tool.

A tapered sealing surface 70 is formed at a tip end portion of the degassing plug 66. A sealing valve seat 71 is provided at a rear end of the adjusting member degassing passage 65 of the adjusting member 56, that is, at a portion with which the sealing surface 70 of the degassing plug 66 contacts. Therefore, by tightening the plug external screw portion 69 of the degassing plug 66 on the plug internal screw portion 68 of the adjusting member 56, the sealing surface 70 can tightly contact the sealing valve seat 71 to seal between the degassing plug 66 and the adjusting member 56. In the present embodiment, the sealing surface 70 and the sealing valve seat 71 constitute a sealing portion 72.

Further, radial degassing passages 73 are formed at a position of the tip end portion of the degassing plug 66, the position being located at a rear side by a predetermined distance from the sealing surface 70. A plurality of radial degassing passages 73 are formed in a radial fashion and communicate with one another at a center portion of the degassing plug 66. In addition, an axial degassing passage 74 is provided so as to extend from a center portion of the radial degassing passage 73 toward the rear side. The axial degassing passage 74 opens on a rear end surface of the degassing plug 66.

Therefore, when the sealing surface 70 is separated from the sealing valve seat 71 by loosening the degassing plug 66, the adjusting member degassing passage 65 of the adjusting member 56 communicates with the axial degassing passage 74 through the radial degassing passage 73. With this, the first space 22 and the second space 28 can communicate with the outside of the oil immersed solenoid 11 through the axial degassing passage 74 of the degassing plug 66. Therefore, the oil in the first and second spaces 22 and 28 can be discharged through a rear end of the degassing plug 66 to the outside.

In the present embodiment, a sealing member 75 is provided between the degassing plug 66 and the adjusting member 56. Even when the degassing plug 66 is loosened, the sealing member 75 seals between the inner surface of the adjusting member 56 and the outer surface of the degassing plug 66 in a predetermined range in which the degassing plug 66 is threadedly engaged with the adjusting member 56. The sealing member 75 is an O ring and provided at an annular groove (O ring groove) 76 formed on the degassing plug 66. With this, even when the oil in the first and second spaces (internal spaces) 22 and 28 is discharged by causing the degassing plug 66 to move in the axial direction, the sealing member 75 prevents the oil from leaking to the outside through a space between the degassing plug 66 and the adjusting member 56.

The sealing member (O ring) 75 does not have to be provided if it is unnecessary to maintain the seal performance between the degassing plug 66 and the adjusting member 56 (for example, if the leakage of a small amount of oil through the space between the degassing plug 66 and the adjusting member 56 during the degassing operation is not a problem).

Further, a pipe connection portion 78 to which a drain oil pipe (hose) 77 is connected is formed at a rear end portion of the degassing plug 66. By connecting the drain oil pipe 77 to the pipe connection portion 78, the oil discharged from the axial degassing passage 74 can be recovered without leaking to the outside. Thus, the degassing operation can be performed without contaminating the periphery with the oil. In addition, by suctioning the oil in the axial degassing passage 74 through the drain oil pipe 77, the pressure in the first and second spaces 22 and 28 becomes negative pressure. With this, the oil in the first and second spaces 22 and 28 and fine air bubbles in the oil can be efficiently discharged. Thus, the degassing operation can be performed quickly. In this case, the sealing member 75 can prevent the air from getting inside through the space between the degassing plug 66 and the adjusting member 56.

As described above, since the adjusting member 56, the degassing plug 66, the movable core 14, the first rod 21, and the second rod 33 are provided on a central axis of the oil immersed solenoid 11, the structure of the oil immersed solenoid 11 can be simplified.

According to the oil immersed solenoid 11 configured as above, when the command electric signal (exciting current) is supplied to the exciting coil 12, the magnetic pole is generated at the fixed magnetic pole portion 13 by the command electric signal. The magnitude of the command electric signal is adjusted in advance by a controller (not shown), and then the command electric signal is supplied to the exciting coil 12. With this, the fixed magnetic pole portion 13 generates the attractive force (magnetic pole) corresponding to the magnitude of the command electric signal. By the magnetic pole generated at the fixed magnetic pole portion 13, the movable core 14 is attracted in a direction (left direction in FIG. 1) toward the fixed magnetic pole portion 13.

Then, by the first rod 21 provided at the movable core 14 attracted by the fixed magnetic pole portion 13, the spool 212 of the valve device 211 is biased in the tip end direction (left direction in FIG. 1). This biasing force and a push-back force (right direction in FIG. 1) that is based on the spring force and hydraulic pressure acting on the spool 212 in a direction opposite to the biasing force balance. Then, the spool 212 stops at a position where these forces balance. With this, the pressure and flow rate of the operating oil flowing through the valve device 211 are caused to correspond to the command electric signal.

Figure 2:
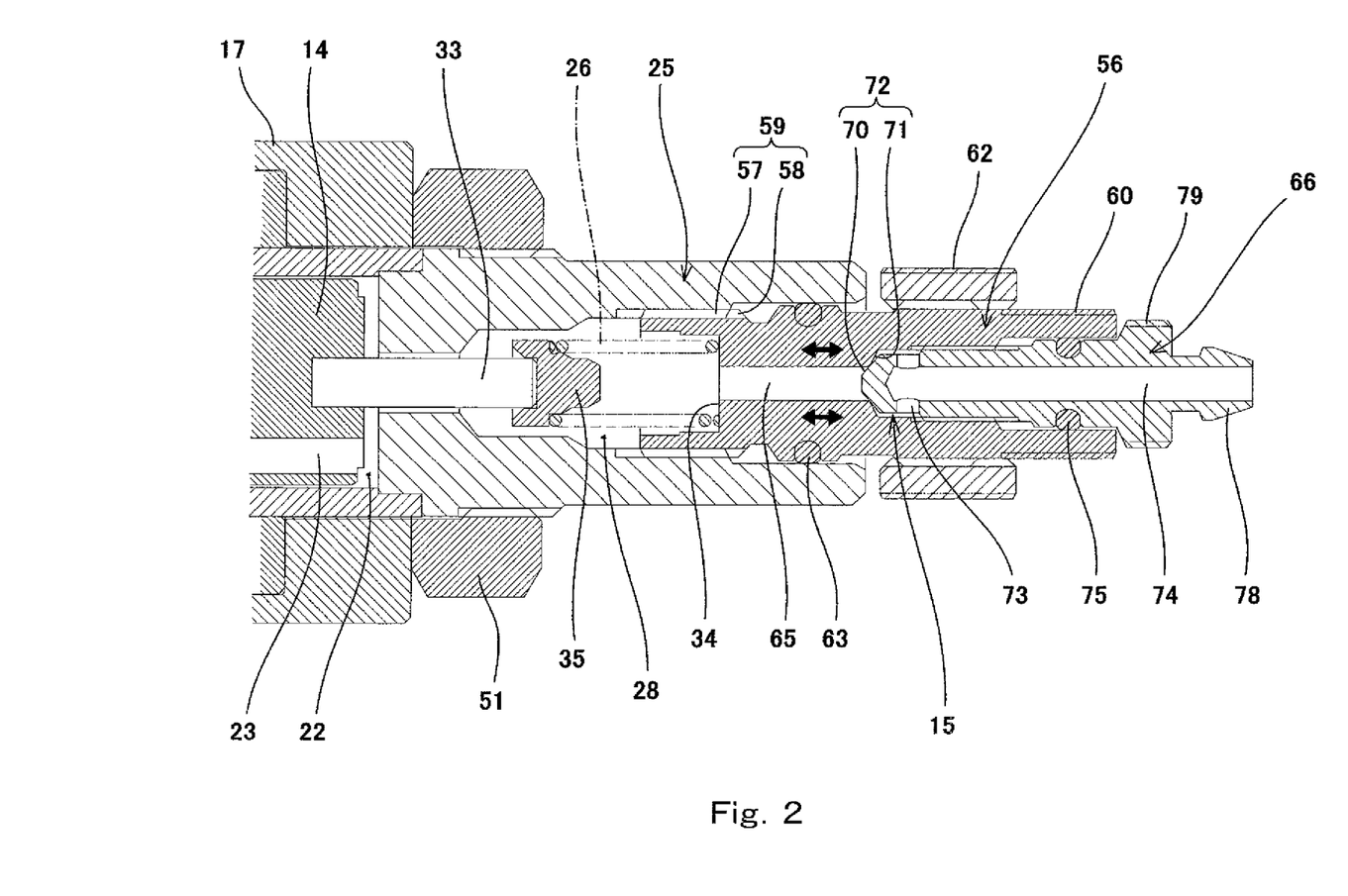
FIG. 2 is an enlarged longitudinal sectional view of the degassing mechanism shown in FIG. 1.
Figure 3:
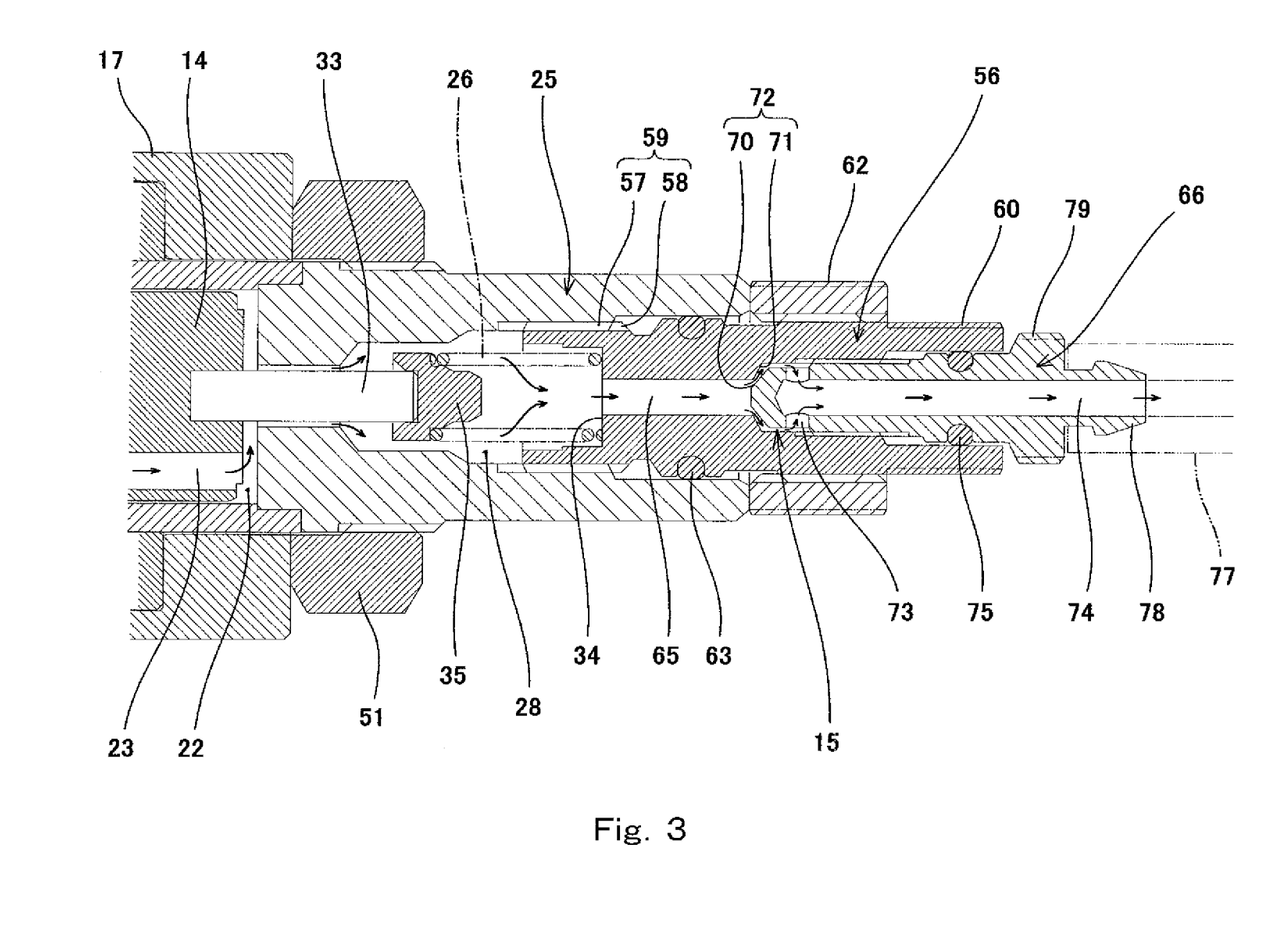
FIG. 3 is a longitudinal sectional view of the degassing mechanism of FIG. 2 during degassing.

Next, based on FIGS. 2 and 3, the following will explain the initial biasing force adjustment and the degassing operation in the oil immersed solenoid 11 including the biasing force adjusting member 56 and the degassing mechanism 15. The following will explain a case where the initial biasing force of the first rod 21 is adjusted by the adjusting spring 26, and then, the degassing operation of the first and second spaces (internal spaces) 22 and 28 is performed.

FIG. 2 shows a state where the adjusting member 56 adjusts the biasing force of the adjusting spring 26. The adjustment of the initial biasing force of the adjusting spring 26 by the adjusting member 56 is performed as follows.

First, the fixing nut 62 that fixes the adjusting member 56 to a rear end portion of the rear case 25 is loosened. With this, the fixation of the adjusting member 56 to the rear case 25 is canceled.

In this state, the rotating portion 60 formed at the rear end portion of the adjusting member 56 is rotated with a tool or the like in a tightening direction or a loosening direction. With this, the axial position of the adjusting member 56 is adjusted. By adjusting the length of thread engagement of the adjusting member 56, the axial relative position of the adjusting member 56 relative to the rear case 25 is adjusted. Thus, the biasing force of the adjusting spring 26 supported by the tip end of the adjusting member 56 is adjusted.

To be specific, by adjusting the axial relative positions of the adjusting member 56 and the rear case 25, the position of the rear end of the adjusting spring 26 supported by the adjusting member 56 changes, so that the initial biasing force of the adjusting spring 26 is adjusted.

After the adjustment of the initial biasing force of the adjusting spring 26 by the adjusting member 56 is completed, the fixing nut 62 is tightened. By causing the fixing nut 62 to push the rear end surface of the rear case 25, the adjusting member 56 is fixed to the rear case 25. The fixing nut 62 is the lock nut of the adjusting member 56. With this, the axial relative positions of the rear case 25 and the adjusting member 56 are fixed.

In this state, since the degassing plug 66 is being screwed into the adjusting member 56, the sealing surface 70 of the tip end portion of the degassing plug 66 tightly contacts the sealing valve seat 71 of the adjusting member 56, so that a rear end portion of the adjusting member degassing passage 65 is sealed.

By adjusting the initial biasing force of the first rod 21 of the oil immersed solenoid 11 in advance as above, variations in the operations of the oil immersed solenoids 11 due to, for example, production errors of constituent parts and variations in the forces acting from the spools 212 are corrected. With this, the control of the pressure and flow rate of the oil by the control part controlled by the first rod 21 based on the same command electric signal (exciting current) can be performed equally among the oil immersed solenoids 11. To be specific, by adjusting the initial biasing force of the first rod 21, the movable core 14 is attracted by the fixed magnetic pole portion 13, and the biasing force of biasing the first rod 21 (FIG. 1) and the spool 212 (FIG. 1) of the valve device 211 (FIG. 1) and the force applied to the spool 212 in a direction opposite to the biasing force substantially balance. With this, in the oil immersed solenoids 11, the pressure and flow rate of the operating oil flowing through the valve device 211 are caused to be proportional to the command electric signal.

The present embodiment has explained an example in which the initial biasing force of the adjusting spring 26 is adjusted in advance. However, the initial biasing force may be adjusted according to need. To be specific, the required initial biasing force differs depending on the specifications of control devices. However, since the oil immersed solenoid of the present invention can variably set the initial biasing force, it can be used for control devices of various specifications.

As shown in FIG. 3, in the case of performing the degassing operation of the first and second spaces (internal spaces) 22 and 28 in a state where the adjustment of the initial biasing force of the adjusting spring 26 by the adjusting member 56 has been completed, the degassing operation is performed in the following manner.

As shown in FIG. 3, the degassing plug 66 screwed into the adjusting member 56 is loosened by rotating the rotating portion 60 provided at the rear portion of the adjusting member 56 with a tool or the like. By loosening the degassing plug 66, the sealing surface 70 of the degassing plug 66 is separated from the sealing valve seat 71 of the adjusting member 56. With this, the adjusting member degassing passage 65 of the adjusting member 56 communicates with the radial degassing passage 73 and axial degassing passage 74 of the degassing plug 66.

Then, the oil in the second space 28 is discharged through the adjusting member degassing passage 65, the radial degassing passage 73, and the axial degassing passage 74 to the pipe connection portion 78. When the oil in the second space 28 is discharged, the oil in the first space 22 flows from the center hole 29, the through hole 23 of the movable core 14, and the like through the adjusting member degassing passage 65 of the adjusting member 56 to the degassing passages 73 and 74 of the degassing plug 66 to be also discharged.

In the present embodiment, the degassing operation is performed in a state where the drain oil pipe 77 is being connected to the pipe connection portion 78 of the degassing plug 66. With this, the oil can be discharged through the drain oil pipe 77 to, for example, a tank, and the degassing operation can be performed without contaminating the periphery of the oil immersed solenoid 11 with the drain oil.

Further, by forcibly suctioning the oil in the first and second spaces (internal spaces) 22 and 28 through the drain oil pipe 77 connected to the pipe connection portion 78, the oil can be quickly discharged to the outside. Thus, the degassing operation can be performed quickly. In addition, since the oil is forcibly suctioned, fine air bubbles in the oil in the internal spaces 22 and 28 can be surely removed.

Even in a case where the degassing plug 66 is caused to move in the front-rear direction relative to the adjusting member 56 in the degassing operation performed after the adjustment of the initial biasing force of the adjusting spring 26 by the adjusting member 56, the relative positions of the adjusting member 56 and the rear case 25 in the front-rear direction do not change at all. Therefore, the twisted state, seating state, and the like of the adjusting spring 26 whose biasing force is adjusted by the adjusting member 56 do not change at all from the states realized after the adjustment of the initial biasing force, and the adjusted states of the adjusting spring 26 are maintained.

To be specific, even in a case where the adjustment of the initial biasing force of the adjusting spring 26 is performed before the degassing operation as in the above embodiment, the degassing operation can be performed without changing the states of the adjusting spring 26 at all. Therefore, the twisted state and seating state of the adjusting spring 26 are not changed by the degassing operation, and the change in the initial biasing force can be eliminated.

Further, even in a case where the biasing force is caused to act on the first rod 21 of the movable core 14 in a direction toward the spool 212 of the valve device 211, the degassing operation can be performed only by loosening the degassing plug 66 provided at the center portion. Therefore, for example, even in a case where the control part (for example, the spool 212) of the hydraulic device, such as the valve device 211, to which the oil immersed solenoid 11 is attached needs to be biased in the degassing operation, the degassing operation can be performed in a state where the biasing force of the adjusting spring 26 is acting on the first rod 21. On this account, the degassing operation can be performed depending on various control parts.

After the degassing operation is completed, the plug external screw portion 69 of the degassing plug 66 is tightened into the plug internal screw portion 68 of the adjusting member 56. With this, the sealing surface 70 at the tip end portion of the degassing plug 66 contacts the sealing valve seat 71 of the adjusting member 56. By causing the sealing surface 70 to tightly contact the sealing valve seat 71, the state shown in FIG. 2 in which the space between the degassing plug 66 and the adjusting member 56 is surely sealed can be easily realized.

Further, as described above, after the adjusting member 56 configured to adjust the biasing force of the adjusting spring 26 is fixed to the rear case 25, the state of the adjusting member 56 holding the adjusting spring 26 does not change at all even if the degassing operation of the first and second spaces (internal spaces) 22 and 28 is performed at any time. Therefore, the same degassing operation can be performed at all times.

In addition, when performing the operation of causing the adjusting member 56 to move in the axial direction to adjust the biasing force of the adjusting spring 26 with respect to the movable core 14 and the degassing operation, the operator can face the degassing plug 66 to perform both operations in the same posture. Thus, the work efficiency is excellent.

Thus, the oil immersed solenoid 11 is obtained, by which even if the air and air bubbles exist in the oil in the first and second spaces (internal spaces) 22 and 28 of the oil immersed solenoid 11, the air and air bubbles can be surely removed by the above degassing operation, and the movable core 14 can be caused to move at an appropriate movement acceleration.

Figure 4:
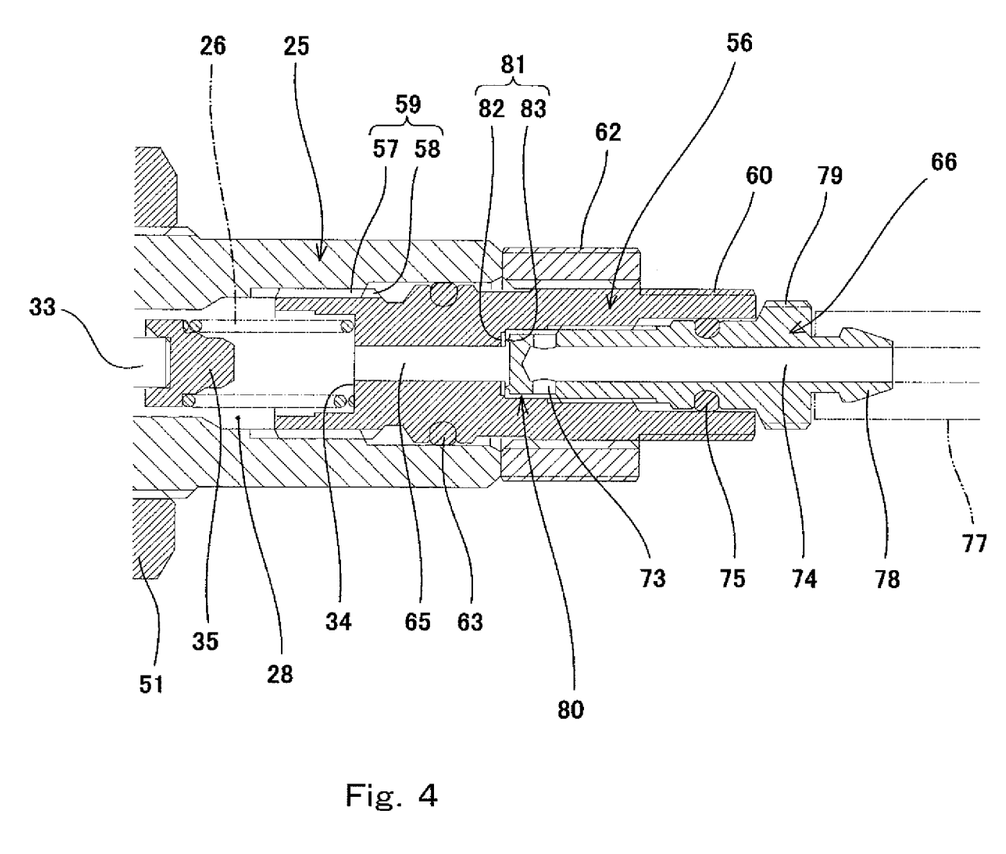
FIG. 4 is an enlarged longitudinal sectional view showing the degassing mechanism according to Embodiment 2 of the present invention.

Next, the following will explain an embodiment that is different from the above embodiment regarding the configuration of the sealing portion 72. FIG. 4 is a diagram showing a degassing mechanism 80 according to Embodiment 2. Embodiment 2 is different from Embodiment 1 regarding the sealing portion 72 formed between the degassing plug 66 and the adjusting member 56. In the following, only the configurations regarding a sealing portion 81 will be explained. The same reference signs are used for the same components as in Embodiment 1, and explanations thereof are omitted.

As shown in FIG. 4, the sealing portion 81 of Embodiment 2 is configured such that: an annular sealing valve seat 82 having a planar shape perpendicular to the axial direction is formed on a rear end surface of the adjusting member degassing passage 65 of the adjusting member 56; and an annular sealing surface 83 configured to tightly contact the annular sealing valve seat 82 is formed to project from the tip end portion of the degassing plug 66. The annular sealing surface 83 is formed to have a larger diameter than the adjusting member degassing passage 65 formed at a middle portion of the annular sealing valve seat 82.

Therefore, by tightening the degassing plug 66 to cause the annular sealing surface 83 to tightly contact the annular sealing valve seat 82, the sealing portion 81 can completely seal between the adjusting member degassing passage 65 of the adjusting member 56 and the radial degassing passage 73 of the degassing plug 66.

In the degassing operation, the degassing plug 66 is loosened to move backward. With this, the annular sealing surface 83 is separated from the annular sealing valve seat 82, so that the adjusting member degassing passage 65 of the adjusting member 56 and the radial degassing passage 73 of the degassing plug 66 communicate with each other. Thus, the oil in the first and second spaces (internal spaces) 22 and 28 can be discharged through a rear end portion of the axial degassing passage 74 to the rear side. The other configurations herein are the same as those in Embodiment 1.

According to the degassing mechanism 80 of Embodiment 2, even in a case where the degassing operation is performed by loosening the degassing plug 66 after the adjustment of the initial biasing force of the adjusting spring 26 by the adjusting member 56, the states of the adjusting spring 26 adjusted by the adjusting member 56 do not change at all. Therefore, regardless of the degassing operation, the attachment height of the adjusting spring 26 can be maintained at the state realized after the adjustment. The other operational advantages herein are the same as those in Embodiment 1, so that detailed explanations thereof are omitted.

Figure 5:
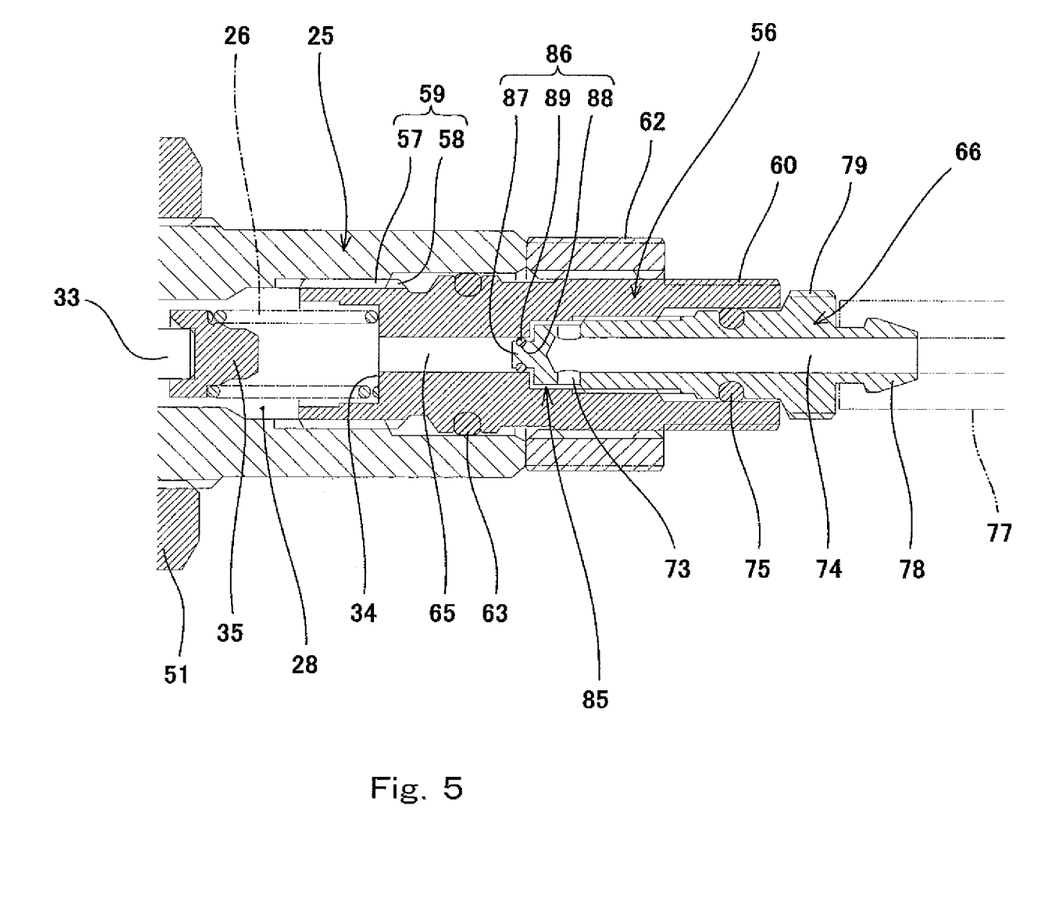
FIG. 5 is an enlarged longitudinal sectional view showing the degassing mechanism according to Embodiment 3 of the present invention.

FIG. 5 is a diagram showing a degassing mechanism 85 according to Embodiment 3. Embodiment 3 is different from Embodiment 1 regarding the sealing portion 72 formed between the degassing plug 66 and the adjusting member 56. In the following, only the configurations regarding a sealing portion 86 will be explained. The same reference signs are used for the same components as in Embodiment 1, and explanations thereof are omitted.

As shown in FIG. 5, the sealing portion 86 of Embodiment 3 is configured such that a columnar portion 87 is formed at the tip end portion of the degassing plug 66 so as to have such a diameter that the columnar portion 87 can be inserted into the adjusting member degassing passage 65 of the adjusting member 56. An O ring groove 88 is formed on an outer periphery of the columnar portion 87, and an O ring 89 is provided in the O ring groove 88. According to Embodiment 3, by inserting the columnar portion 87 of the tip end of the degassing plug 66 into the adjusting member degassing passage 65, the O ring 89 can seal between the adjusting member degassing passage 65 and the degassing plug 66.

In the degassing operation, the degassing plug 66 is loosened to move backward. With this, the O ring 89 is separated from the adjusting member degassing passage 65, and the adjusting member degassing passage 65 of the adjusting member 56 and the radial degassing passage 73 of the degassing plug 66 communicate with each other. With this, the oil in the second space (internal space) 28 can be discharged through the rear end portion of the axial degassing passage 74 to the rear side. The other configurations herein are the same as those in Embodiment 1.

According to the degassing mechanism 85 of Embodiment 3, even in a case where the degassing operation is performed by loosening the degassing plug 66 after the adjustment of the initial biasing force of the adjusting spring 26 by the adjusting member 56, the states of the adjusting spring 26 adjusted by the adjusting member 56 do not change at all. Therefore, regardless of the degassing operation, the biasing force of the adjusting spring 26 can be maintained at the state realized after the adjustment. The other operational advantages herein are the same as those in Embodiment 1, so that detailed explanations thereof are omitted.

Each of the degassing mechanisms 80 and 85 shown in FIGS. 4 and 5 is just one example. The configurations of the sealing portions 81 and 86 each configured to seal the adjusting member degassing passage 65, communicating with the first and second spaces (internal spaces) 22 and 28, by using the degassing plug 66 may be different from the above configurations.

As above, according to the oil immersed solenoid 11 including the degassing mechanism 15 (80 or 85), even in a case where the degassing operation of the first and second spaces (internal spaces) 22 and 28 of the oil immersed solenoid 11 is performed after the adjustment of the initial biasing force of the movable core 14 by the adjusting spring 26, the biased state of the movable core 14 biased by the adjusting spring 26 does not change at all. Therefore, the degassing operation can be performed without affecting the biasing force of the adjusting spring 26 with respect to the movable core 14.

Therefore, even in a case where the degassing operation is regarded as a subsequent operation performed after the adjustment of the initial biasing force, the error of the biasing force of the adjusting spring 26 adjusted by the adjusting member 56 does not occur, and it is unnecessary to again perform the adjustment of the initial biasing force by the adjusting member 56.

Moreover, in the degassing operation, the oil can be discharged through the drain oil pipe 77. Therefore, the degassing operation can be performed without contaminating the periphery of the oil immersed solenoid 11 with the oil.

In addition, the oil in the first and second spaces (internal spaces) 22 and 28 can be suctioned through the drain oil pipe 77. Thus, the oil in the first and second spaces (internal spaces) 22 and 28 can be quickly discharged, so that the degassing operation can be efficiently performed. The pipe connection portion 78 does not have to have a shape to which a pipe can be connected, and may have any shape as long as the pipe connection portion 78 is open.

Even in a state where a force is acting on the first rod 21 from the spool 212 (control part), the degassing operation can be performed only by loosening the degassing plug 66 while maintaining the biasing force of the adjusting spring 26. Therefore, the oil immersed solenoid 11 can be utilized even in a case where the control part needs to be biased in the degassing operation.

Each of the above embodiments has explained an example in which the degassing operation is performed after the adjustment of the initial biasing force of the adjusting spring 26. However, since the degassing operation of the first and second spaces (internal spaces) 22 and 28 can be performed separately from the adjustment of the initial biasing force of the adjusting spring 26, the adjustment of the biasing force of the adjusting spring 26 by the adjusting member 56 and the degassing operation of the oil immersed solenoid 11 can be performed in the order that is convenient in the actual work.

Each of the above embodiments has explained the push-type oil immersed solenoid 11. However, the above embodiments are also applicable to a pull-type oil immersed solenoid 11 (in which the biasing force is caused to act in such a direction that the first rod 21 pulls the spool 212). The type of the oil immersed solenoid is not limited to the above embodiments.

Each of the above embodiments has explained an example in which the oil immersed solenoid 11 controls the spool (control part) 212 of the valve device 211. However, the oil immersed solenoid 11 can control the other hydraulic devices in the same manner, and the control part is not limited to the above embodiments.

Further, each of the above embodiments is just one example, and various modifications may be made within the spirit of the present invention. The present invention is not limited to the above embodiments.

INDUSTRIAL APPLICABILITY

The oil immersed solenoid according to the present invention can be utilized to control the control part that requires strict adjustment of the biasing force of the adjusting spring.

REFERENCE SIGNS LIST 11 oil immersed solenoid
12 exciting coil
13 fixed magnetic pole portion
14 movable core
15 degassing mechanism
17 main body case
21 first rod
22 first space (internal space)
23 through hole
24 center hole
25 rear case
26 adjusting spring
28 second space (internal space)
29 center hole
30 opening end portion
33 second rod
34 first spring seat
35 second spring seat
56 biasing force adjusting member
59 screw mechanism
61 fixing external screw portion
62 fixing nut
63 sealing member
65 adjusting member degassing passage
66 degassing plug
67 opening end portion
68 plug internal screw portion
69 plug external screw portion
70 sealing surface
71 sealing valve seat
72 sealing portion
73 radial degassing passage
74 axial degassing passage
75 sealing member (O ring)
76 annular groove (O ring groove)
77 drain oil pipe (hose)
78 pipe connection portion
80 degassing mechanism
81 sealing portion
82 annular sealing valve seat
83 annular sealing surface
85 degassing mechanism
86 sealing portion
87 columnar portion
88 O ring groove
89 O ring
211 valve device
212 spool (control part)

The invention claimed is:

1. An oil immersed solenoid comprising:
a case having a tubular internal space;
a movable core configured to move in the internal space of the case in an axial direction of the internal space to apply a biasing force to a control part;
a fixed magnetic pole portion configured to attract the movable core in the axial direction of the internal space;
an adjusting spring configured to apply the biasing force to the movable core;
a biasing force adjusting member provided at an opening end portion of the case and configured to adjust an axial position thereof to adjust the biasing force of the adjusting spring; and
a degassing member provided at an opening end portion of the biasing force adjusting member and including a degassing passage that allows the internal space to communicate with an outside by changing relative positions of the biasing force adjusting member and the degassing member, wherein
a sealing portion configured to open or close the degassing passage is provided between the biasing force adjusting member and the degassing member.

2. The oil immersed solenoid according to claim 1, wherein the degassing member includes a pipe connection portion at an outside open portion of the degassing passage.

3. The oil immersed solenoid according to claim 1, wherein:
the biasing force adjusting member includes a screw mechanism that allows the degassing member to move in an axial direction of the biasing force adjusting member; and
the sealing portion includes a sealing surface configured to open or close the degassing passage in such a manner that the degassing member is caused to move in the axial direction of the biasing force adjusting member by the screw mechanism.

4. The oil immersed solenoid according to claim 3, wherein the sealing portion is constituted by the sealing surface provided at an end portion of the degassing member and a sealing valve seat provided at the biasing force adjusting member.

5. The oil immersed solenoid according to claim 3, comprising a sealing member provided between the biasing force adjusting member and the degassing member and configured to seal between the biasing force adjusting member and the degassing member when the degassing member moves in the axial direction.

6. The oil immersed solenoid according to claim 1, wherein:
the adjusting spring is a compression coil spring;
the compression coil spring is provided such that a central axis thereof coincides with a central axis of the biasing force adjusting member;
the degassing member is provided on the central axis of biasing force adjusting member; and
the degassing passage is provided on a central axis of the degassing member.

7. The oil immersed solenoid according to claim 1, wherein:
an attachment height of the adjusting spring is variably adjusted by causing the biasing force adjusting member, threadedly engaged with the opening end portion of the case, to move in the axial direction;
the biasing force adjusting member includes a screw portion on an outer surface of a rear portion thereof; and
by causing a nut to be threadedly engaged with the screw portion and causing the nut to push an end surface of the case, the biasing force adjusting member is fixed to the case, and the attachment height of the adjusting spring is determined.

* * * * *